United States Patent [19]
Peyre et al.

[11] Patent Number: 5,654,689
[45] Date of Patent: Aug. 5, 1997

[54] ELECTRIC ANTI-THEFT SECURITY SYSTEM

[75] Inventors: Jean Peyre, Houilles; Arnaud Humbert, Creteil; Olivier Demouy, Paris, all of France

[73] Assignee: Valeo Securite Habitacle, Creteil, France

[21] Appl. No.: 622,032

[22] Filed: Mar. 26, 1996

[51] Int. Cl.$^6$ .................................................. B60R 25/10
[52] U.S. Cl. .......................... 340/426; 340/428; 180/287; 307/10.3; 307/10.6
[58] Field of Search .................... 340/425.5, 426, 340/428, 438, 441; 180/271, 287; 307/10.2, 10.3, 10.6

[56] References Cited

U.S. PATENT DOCUMENTS

| | | | |
|---|---|---|---|
| 1,798,917 | 3/1931 | Van DeGrift | 70/248 |
| 3,735,833 | 5/1973 | Sutkowski | 180/289 |
| 4,291,237 | 9/1981 | Kitano | 180/287 |
| 5,133,426 | 7/1992 | Niriella et al. | 340/426 |
| 5,283,473 | 2/1994 | Furuse et al. | 307/10.6 |
| 5,289,907 | 3/1994 | Pattock | 180/271 |
| 5,451,925 | 9/1995 | Le | 340/426 |

FOREIGN PATENT DOCUMENTS

| | | |
|---|---|---|
| 2 454 503 | 11/1980 | France . |
| 2710599 | 4/1995 | France . |

OTHER PUBLICATIONS

Ein Fahrzeugsicherungssystem ohne mechanischen Schlussel, pp. 321–323 and 330; 180 ATZ Automobiltechnische Zeitschrift 96 (1994) Mai, No. 5, Stuttgart, DE.
French Search Report, 19 Jan. 1996.

*Primary Examiner*—Jeffery Hofsass
*Assistant Examiner*—Daniel J. Wu
*Attorney, Agent, or Firm*—Morgan & Finnegan, L.L.P.

[57] ABSTRACT

An electrical anti-theft security system for a motor vehicle includes an anti-theft security switch for controlling starting of the engine of the vehicle and for the supply of power to various electrical circuits of the vehicle. This anti-theft switch comprises a key interruptor and a multiple position control interruptor for controlling, in sequence, the power supply to various electrical circuits of the vehicle, including those for the ignition and the starter. The system also includes interruptors for the power supply of the electric motor of the anti-theft system, together with an immobilizing device for preventing the supply of power to at least one electrical circuit of the vehicle when the anti-theft system is not in its unlocked condition.

13 Claims, 14 Drawing Sheets

ELECTRIC ANTI-THEFT SECURITY SYSTEM

FIELD OF THE INVENTION

The present invention relates to electric anti-theft security systems, in particular for a motor vehicle.

BACKGROUND OF THE INVENTION

It has previously been proposed to provide apparatus which enables the doors or other opening parts of something that is capable of being broken into by unauthorised persons, and in particular a motor vehicle, to be unlocked by remote control, and therefore without any contact, either electrical or mechanical, with the doors or other opening parts. In particular, keyless access techniques have been developed which enable access to be gained to a vehicle without the need to find a mechanical key, or the equivalent of a key, in order to gain access.

Such a system is very attractive from the comfort or convenience point of view and also because it offers various possibilities for obtaining access using modern information technology.

In the application of this concept to the locking and unlocking of opening parts, such as doors, for example those of a motor vehicle, or the locking and unlocking of an anti-theft security system for a vehicle, such as that which involves locking the steering column or the output shaft of the gearbox of a vehicle, mechanical systems have been proposed in these contexts which employ electrical actuating devices, for example a rotary electric motor or an electromagnet.

When the system for obtaining access recognises that a right of access exists, and that an unauthorised demand for access also exists, a control member produces a command for actuation of the system which excites the electrical actuating device. The anti-theft system and/or the lock changes state by passing from the locked condition to the unlocked condition. When the user leaves the vehicle, and/or when it is desired to activate the anti-theft system, a similar sequence takes place in reverse.

In one known design, which is described and shown in the specification of French patent application No. 93 11671 of 30 Sep. 1993, it was proposed to provide a method of control for an anti-theft system for a motor vehicle, in particular with a remote control access system, which, in particular, employs a switch for controlling starting of the vehicle, and the supply of electrical power to various electrical circuits of the vehicle, in particular the power supply circuits for the accessories and the ignition circuit for the engine of the vehicle.

In that method, during a phase of deactivation of the anti-theft system, contact is made with the vehicle by means of, for example, a telecontrol unit. An anti-theft security switch is then operated, which reproduces the manipulation of the conventional mechanical keys, and a predetermined position of the security switch is detected so as to set up an interrogation procedure in order to identify the demand to unlock the anti-theft system. In response to this, a command or order for actuation of successive positions of the security switch, and finally a command to unlock the anti-theft system, are produced.

In an activating phase of the anti-theft system, the step in which the anti-theft system is activated by operation of the security switch is detected. This operation of the switch reproduces the conventional manipulations of mechanical keys. Once this step is completed, the system is activated, and the successive positions of the security switch are deactivated.

In order to realise such a procedure in practice, it is necessary to provide an electrical anti-theft security system of the type comprising:

- an anti-theft security switch for controlling the power supply to various electrical circuits of the vehicle;
- a motorised security device comprising a motorised blocking member such as a steering column lock, which includes an electric motor for moving the blocking member between a locked position and an unlocked position;
- and a central anti-theft unit which is connected to the elements mentioned above for the purpose of implementing a procedure in which the anti-theft system is armed or disarmed.

This system is also of the type in which the anti-theft security switch comprises:

- a key interruptor for detecting simulation of the introduction of a key into the anti-theft switch;
- and a multiple position control interruptor for controlling, in sequence, the power supply for the said electrical circuits of the vehicle, this control interruptor comprising a movable control contact which is connected to one polarity of a power supply source, and a set of fixed contacts with which the movable contact makes successive contact during operation of the security switch with a view to enabling the vehicle to be started, the control interruptor being unable to be actuated except in the presence of a key.

An electrical anti-theft security system has to give the user the same degree of security as an anti-theft system having conventional key-operated mechanical control; and in particular it must be able to prevent any starting of the vehicle when the above mentioned blocking member of the motorised security device is not in its unlocked position.

Preferably it must also avoid any possibility of the system being activated towards its locked position when the vehicle is moving.

DISCUSSION OF THE INVENTION

An object of the present invention is to propose an electrical anti-theft security system of the type discussed above which responds to these security requirements.

According to the invention, an electrical anti-theft security system, of the type comprising:

- an anti-theft security switch for controlling the power supply to various electrical circuits of the vehicle;
- a motorised security device comprising a motorised blocking member such as a steering column lock, which includes an electric motor for moving the blocking member between a locked position and an unlocked position;
- and a central anti-theft unit which is connected to the elements mentioned above for the purpose of implementing a procedure in which the anti-theft system is armed or disarmed, the system being also of the type in which the anti-theft security switch comprises:
  - a key interruptor for detecting simulation of the introduction of a key into the anti-theft switch;
  - and a multiple position control interruptor for controlling, in sequence, the power supply for the said electrical circuits of the vehicle, this control interruptor comprising a movable control contact which is connected to one polarity of a power supply source, and a set of fixed contacts with which the movable contact makes successive contact during operation of the security switch with a view to enabling the vehicle to be started, the control interruptor being unable to be actuated except in the presence of a key, is characterised in that at least one of the electrical circuits of the vehicle is connected to one polarity of the power supply source through the multiple position control interruptor, and through an immobilising device which establishes the electrical power supply for the said at least one circuit only when the anti-theft system is in its unlocked position; and in that the key interruptor has a movable contact which is connected to the power supply source, and which is adapted:

to cooperate, in the absence of a key, with a first fixed contact, which is connected to the drive motor of the motorised security device through a first power supply interruptor which is open when the system is in its locked condition;

and to cooperate, in the presence of a key, with a second fixed contact which is connected to the drive motor of the motorised security device and through a second power supply interruptor which is open when the anti-theft system is in its unlocked condition;

and in that the central anti-theft unit includes an input for detection of a change of position of the movable contact of the key interruptor;

and in that the central anti-theft unit includes an input for detection of the locked condition of the anti-theft system, together with an input for detection of the unlocked condition of the anti-theft system, the two last mentioned inputs being connected to means for detecting the condition of the system.

According to a preferred feature of the invention, the immobilising device is an immobilising interruptor, the movable contact of which is connected to the said fixed contact of the control interruptor and cooperates with a fixed contact pad connected to the said at least one electrical circuit when the anti-theft system is in its unlocked condition.

The movable control contact of the multiple position control interruptor of the anti-theft security switch is preferably connected to one polarity of the power supply source through the immobilising device that enables electrical connection to be established only when the system is in its unlocked condition.

The immobilising device preferably includes an immobilising interruptor, the movable contact of which is connected to the said polarity of the power supply source and cooperates with a fixed contact connected to the movable control contact when the system is in its unlocked condition.

The movable contact of the immobilising interruptor is preferably coupled to the motor of the motorised anti-theft system, for rotation with the latter.

Preferably, the first power supply interruptor is constituted by a movable contact which is permanently connected to the said motor, and which is arranged to cooperate with a first fixed contact connected to the first fixed contact of the key interruptor when the first power supply interruptor is closed.

The second power supply interruptor is preferably constituted by a movable contact which is permanently connected to the said motor, and which is arranged to cooperate with a second fixed contact connected to the second fixed contact of the key interruptor when the second power supply interruptor is in its closed position.

The said fixed first and second contacts of the power supply interruptor are preferably in the form of conductive strips offset from each other, and the said movable contact associated therewith may be a movable contact which is common to the said first and second power supply interruptors, being coupled to the electric motor of the system for rotation with the latter.

The said input of the central anti-theft unit for detecting the change of position of the movable contact of the key interruptor is preferably connected to one polarity of the power supply source through an interruptor having a movable contact which is displaceable simultaneously with the movable contact of the key interruptor, and which is closed in the absence of a key.

According to a preferred feature of the invention, the means for detecting the condition (i.e. unlocked or locked) of the anti-theft system comprise:

an interruptor for detecting that the anti-theft system is in its locked condition, comprising a movable contact which is connected to one polarity of the power supply source, and which is arranged to cooperate with a fixed contact that is connected, when the system is in its locked condition, to the said input of the central anti-theft unit for detection of the locked condition of the system; and an interruptor for detection that the anti-theft system is in its unlocked condition, comprising a movable contact which is connected to one polarity of the power supply source, and which is arranged to cooperate with a fixed contact that is connected, when the system is in its unlocked condition, to the said input of the central anti-theft unit for detection of the unlocked condition of the system.

The movable contact of the interruptor for detection of the locked condition of the system is preferably connected to the said first fixed contact of the key interruptor, and the movable contact of the interruptor for detecting that the system is in its unlocked condition is preferably connected to a second fixed contact of the key interruptor.

In one embodiment of the invention, the movable contact of the interruptor for detecting that the system is in its locked condition is constituted by the movable contact of the first power supply interruptor, which is arranged to cooperate with a fixed contact connected, when the first power supply interruptor is open, to the input of the central anti-theft unit for detecting that the system is in its locked condition; and the movable contact of the interruptor for detecting that the system is in its unlocked condition is constituted by the movable contact of the second power supply interruptor, which is arranged to cooperate with a fixed contact connected, when the second power supply interruptor is open, to the input of the central anti-theft unit for detection that the system is in its unlocked condition.

Preferably, the anti-theft system includes an electrical power supply unit for controlling the power supply to the motor, the said power supply unit being adapted to receive commands for locking or unlocking the system from the central anti-theft unit, the power supply unit having a first power supply terminal permanently connected to a first polarity of the power supply source, and a second terminal which is arranged to be connected to the second polarity of the power supply source through the key interruptor and through one or other of the first and second power supply interruptors.

The anti-theft security switch is preferably a rotary switch.

Further features and advantages of the invention will appear more clearly on a reading of the following detailed description of preferred embodiments of the invention, given by way of example only and with reference to the accompanying drawings.

DESCRIPTION OF PREFERRED EMBODIMENTS OF THE INVENTION

Figure 1:
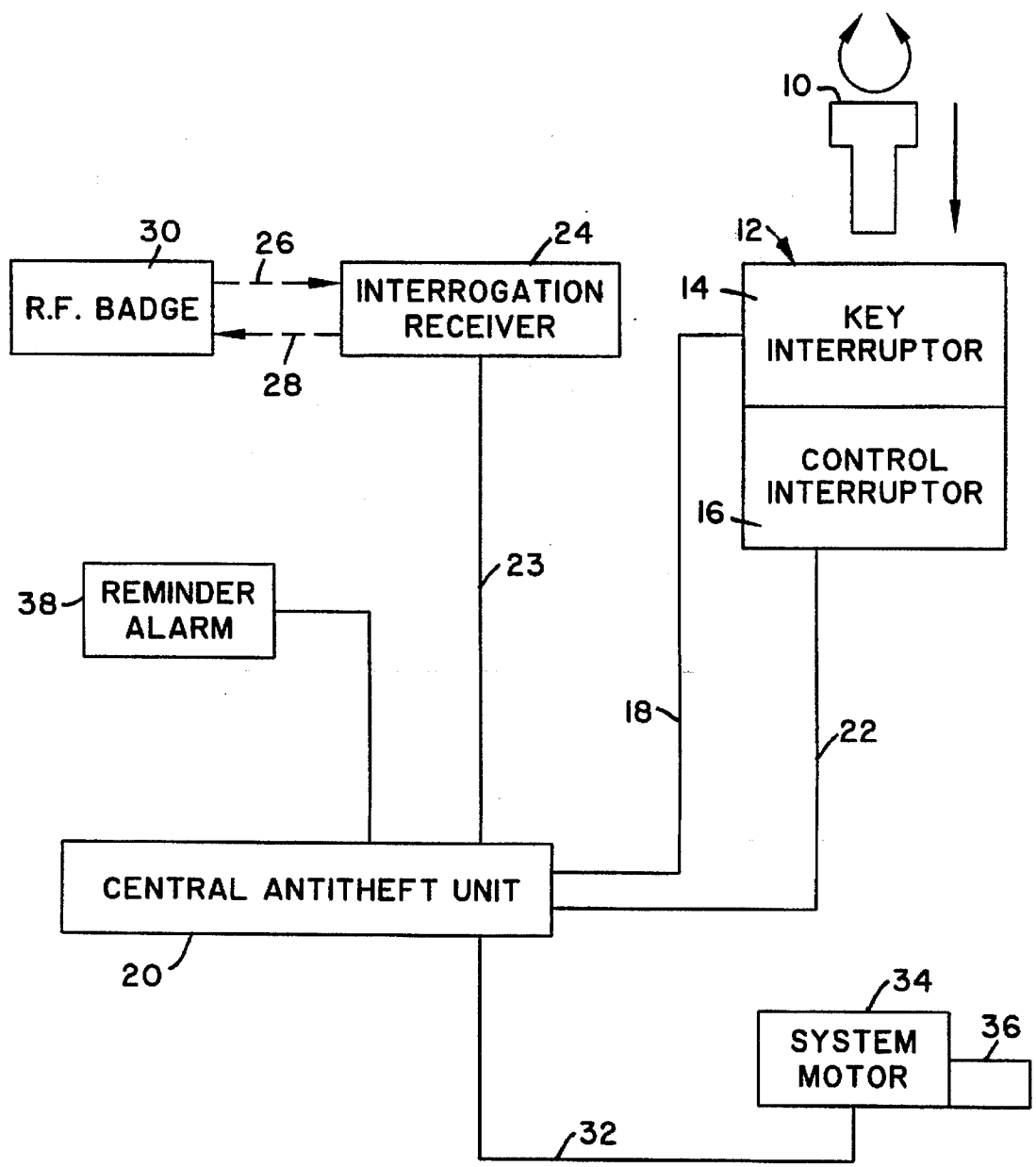
FIG. 1 is a diagram illustrating an embodiment of an anti-theft system in accordance with the state of the art, including a central anti-theft unit.

The electrical anti-theft security system in accordance with the current state of the art, as shown diagrammatically in FIG. 1, includes a key 10, or a "false key", which is adapted to be introduced into the key barrel, or into a "false" key barrel, of an anti-theft security switch 12.

The switch 12 is arranged to be mounted on the fascia of the vehicle, and its design is of a substantially similar type to that of the ignition switch of a vehicle in a conventional form. The user operates the contact key 10, or an ignition ring which simulates such an operation. The contact key 10 is in fact, in this example, a false key, and it does not necessarily operate on a mechanical lock, even though an actual key of this kind does afford an additional degree of safety by adding a supplementary locking or unlocking means in series with the general design of an electrical anti-theft system.

The security switch 12 comprises a key interruptor 14 which is adapted to detect the absence of the key 10 or the presence of the latter in position when it has been introduced. The switch 12 also includes a multiple position control interruptor 16, for controlling the starting of the engine of the vehicle and for controlling the power supply to various electrical circuits of the vehicle, and in particular the ignition circuit for its internal combustion engine.

The key interruptor 14 is connected through a line 18 to one input of an electronic central anti-theft unit 20, while the control interruptor 16 is connected through a line 22 to another input of the central anti-theft unit 20.

The central anti-theft unit includes an analysis circuit which is, in particular, capable of reading the positions, or states, of the interruptors 14 and 16 in the switch 12. For example, the anti-theft unit 20 may include a microcontroller such as an INTEL 8051 circuit. This circuit contains a programme for reading the input ports so as to inform the central anti-theft unit of the positions of the various interruptors of the switch 12, as will be explained later herein.

In accordance with a known design, and through another input and a line 23, the central anti-theft unit is able to exchange signals with an interrogation and receiving station 24, which in turn exchanges, through further lines 26 and 28, signals with, for example, a badge 30 carried by the user for giving keyless access to the vehicle.

Depending on these exchanges of signals with the central anti-theft unit 20, the latter produces, on a connecting line 32, a command signal for energising an anti-theft motor 34 which acts on a blocking member 36 for mechanically locking the steering column of the vehicle or the output shaft of the gearbox. The motor 34 and blocking member 36 together constitute a motorised security device.

In FIG. 1, the motor 34 is referred to as a "system motor", for reasons that will become apparent later herein.

In addition, if the user overlooks the radio frequency badge 30 inside the vehicle by mistake, or if he omits to operate the key 10 in order to initiate a sequence for locking the anti-theft system, or if he leaves his badge 30 in the vehicle by mistake, the central anti-theft unit 20 sets off a reminder alarm 38.

A first embodiment of an electrical anti-theft security system in accordance with the invention will now be described with reference to FIG. 2, in which those components which are identical or similar to those in FIG. 1 are designated by the same reference signs.

The key interruptor 14 includes a pivoting movable contact 42 which is permanently connected to the negative terminal -BAT of the battery of the vehicle. The free end of the contact 42 cooperates with a fixed contact 44 in the absence of the key, or with a fixed contact 46 when the key 10 is introduced into the anti-theft security switch 12, or when such an introduction is simulated.

The key interruptor 14 is associated, in parallel, with a complementary key interruptor 48, which includes a movable contact 50 which is displaceable simultaneously with the movable contact 42 of the key interruptor 14.

The movable contact 50 is permanently connected through the line 18 to the "DEMAND" input port of the central anti-theft unit 20, so that the latter is able to set in train a sequence of steps for identification of the demand for unlocking of the anti-theft system, or the demand for locking of the anti-theft system.

Figure 3:
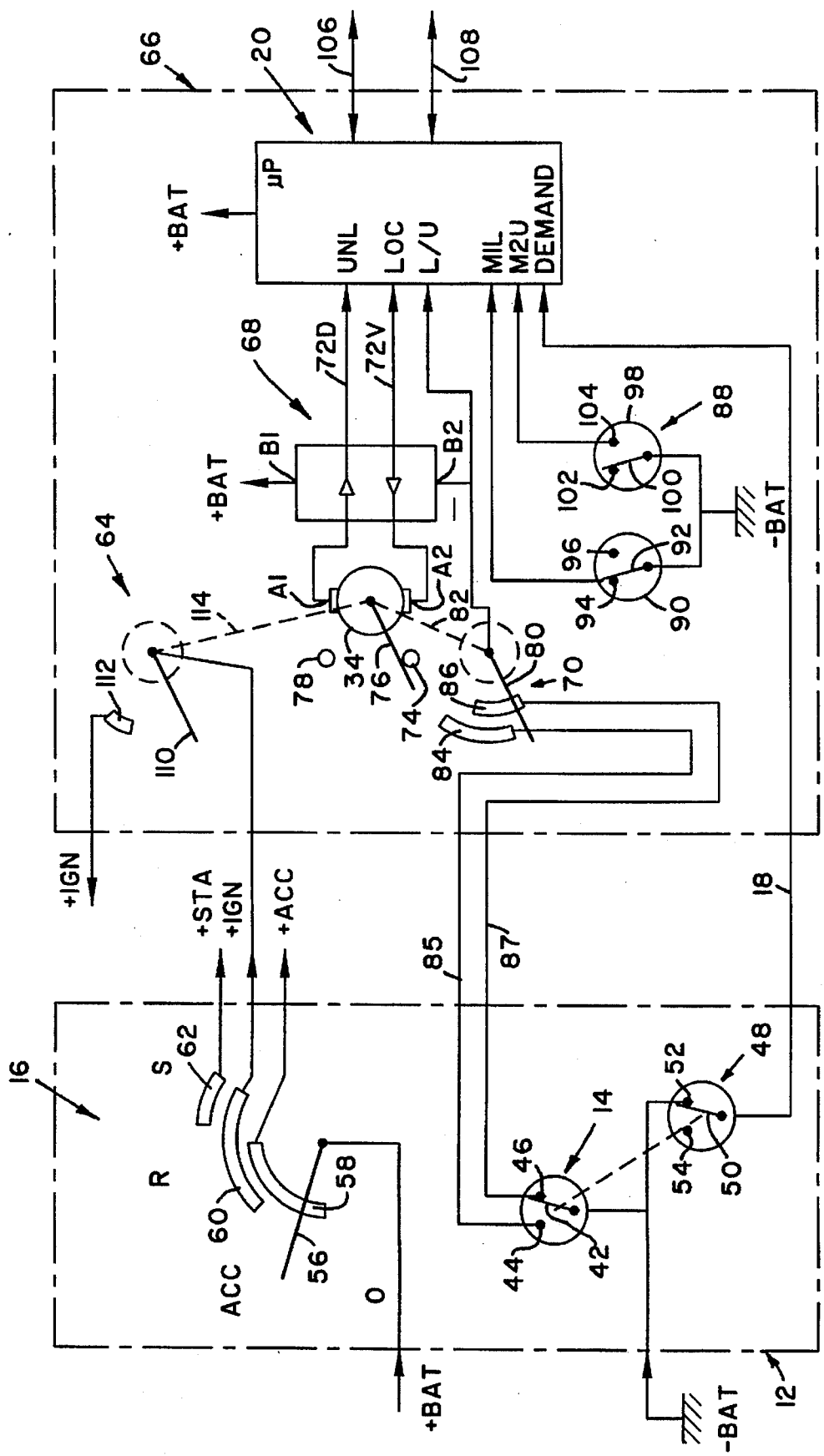
FIG. 3 is a diagram similar to that in FIG. 2, in which the electrical anti-theft system is shown in a locked state and in the presence of a key.

The movable contact of the complementary key interruptor 48 is arranged to cooperate with a fixed contact 52 in the presence of a key, as can be seen in particular in FIG. 3, so as to connect the "DEMAND" input of the central anti-theft unit 20 electrically to the negative polarity -BAT of the battery of the vehicle. In the absence of a key, the movable contact 50 cooperates with the fixed contact 54, which is a neutral or dead contact; and the "DEMAND" input port is not connected to any terminal of the vehicle battery.

The multiple position control interruptor 16 is of the rotary type, and includes a movable control contact 56 which is permanently connected to the positive terminal +BAT of the battery of the vehicle.

The movable control contact 56 is arranged to occupy a plurality of successive positions which are offset from each other in the direction of rotation of the contact 56. These positions are designated "0", "ACC", "R" and "S" in the drawings. In these successive positions, namely a stop position (0), a position for supplying power to electrical accessories of the vehicle (ACC), a running position (R), and a position for starting the engine of the vehicle (S), the rotary control contact 56 is arranged to cooperate with one or more conductive strips 58, 60, 62 which are arranged in an arc of a circle and which constitute the fixed contacts of the interruptor 16.

When the movable contact 56 is in the ACC position, it cooperates with the fixed strip 58, which is connected electrically to the power supply circuit +ACC for the accessories of the vehicle.

When the movable control contact 56 is in the "R" position, it is simultaneously in contact with the contact strip 58 and also with the further contact strip 60, which is connected to the ignition circuit +IGN of the engine of the vehicle, with an immobilising device 64 being interposed.

When the movable control contact 56 is in the "S" position, it is in simultaneous contact with the fixed contact strip 60 and with the fixed contact strip 62, which is connected to the electrical power supply circuit +STA for the starter of the engine of the vehicle.

The anti-theft system includes a disabling module 66, which is surrounded by a chain dotted box in the right hand part of FIG. 2, and which will now be described in greater detail.

The motor 34 of the motorised anti-theft security system is an electric motor having two opposed terminals A1 and A2, which are connected to an electrical power supply unit 68 for the motor 34. A first terminal B1 of the power supply unit 68 is connected permanently to the positive terminal +BAT of the battery of the vehicle, while its second L/U of the central anti-theft unit 20, which is an input for detection of the change of state of this second terminal B2. As will be explained later herein, the second terminal B2 of the power supply unit 68 is also connected to the negative terminal −BAT of the battery, in this case via the key interruptor 14, and via power supply interruptors indicated at 70.

The power supply unit 68 receives commands for the power supply of the motor 34 with a view to causing it to be unlocked or locked, via lines 72D and 72V which are connected to output ports UNL and LOC respectively of the central anti-theft unit 20.

In response to the power supply from the unit 68 and the commands issued by the central anti-theft unit 20, the motor 34 is arranged to turn in either one direction or the other between a locked position and an unlocked position of the anti-theft system. A mechanical feeler member 76 is coupled in rotation to the output shaft of the motor 34, for rotation between two angular positions in which the feeler member comes into engagement against a respective stop member 74 or 78. The locked position and the unlocked position of the anti-theft system are determined by the engagement of the feeler member 76 with the stop members 74 and 78 respectively.

The two interruptors for the power supply to the second terminal B2 of the power supply unit 68 will now be described. These interruptors have a common rotating contact 80, which is coupled in rotation to the output shaft of the motor 34 through a mechanical linkage which is indicated diagrammatically by the phantom line 82.

In order to define the first power supply interruptor in the sense of the present document, the rotary contact 80 is arranged to either cooperate or not cooperate with a fixed first contact 84, which is made in the form of a conductive strip connected to the fixed first contact 44 of the key interruptor 14 via a line 85. The first power supply interruptor 80, 84 is open when the anti-theft system is in its locked condition, and it is closed in all other conditions of the system.

The second power supply interruptor for the terminal B2 is constituted by the rotating contact 80, which is arranged to cooperate with a fixed second contact 86 in the form of an electrically conductive contact strip permanently connected to the fixed second contact 46 of the key interruptor 14 through a line 87. The second power supply interruptor 80, 86 is open only when the anti-theft system is in its unlocked position, and it is closed in all other conditions of the system.

The central anti-theft unit 20 has a further input port M1L for detection of the locked state of the anti-theft system, together with an input port M2U for detecting the unlocked state of the system.

The input ports M1L and M2U are connected with means 88 for detecting the state of the system.

In this first embodiment, the system state detector 88 comprises an interruptor 90 for detection of the locked condition of the system. The interruptor 90 has a moving contact 92 which is permanently connected to the negative terminal −BAT of the battery of the vehicle, and which, when the system is in its locked condition, cooperates with a fixed contact 92 that is permanently connected to the input M1L of the central anti-theft unit 20. When the system is not in its locked position, the movable contact 92 of the interruptor 90 for detecting the locked state of the system cooperates with a fixed dead contact 96.

The detecting means 88 for detecting the state of the anti-theft security system also include a further interruptor 98 for detection of the unlocked state of the system. The interruptor 98 comprises a moving contact 100 which is permanently connected to the negative terminal −BAT of the battery of the vehicle.

The movable contact 100 cooperates with a fixed dead contact 102 when the system is not in its unlocked condition, and cooperates with a fixed contact 104, which is permanently connected to the input M2U of the central anti-theft unit 20, when the system is in its unlocked state.

Finally, the central anti-theft unit 20 is connected through a coded link 106 to the other components of the electrical anti-theft security system, and through a link 108 to appropriate diagnostic means.

The immobilising device 64 comprises, in this first embodiment, a rotary immobiliser interruptor which comprises a rotatable immobiliser contact 110. The latter is permanently connected to the conductive contact strip 60 of the multiple position control interruptor 16. The moving contact 110 is arranged to cooperate, but only when the anti-theft system is in its unlocked state, with a fixed contact pad 112, which is connected to the electric circuit +IGN that supplies power to the ignition system of the engine of the vehicle. To this end, the rotatable immobiliser contact 110 is coupled to the output shaft of the motor 34 through a mechanical linkage which is indicated diagrammatically by the broken line 114 in FIG. 2.

The operation of this anti-theft security system will now be described with reference to FIGS. 2 to 7. In the locked position seen in FIG. 2, and in the absence of a key, the motor 34 is in the position in which the feeler member 76 is in contact with the stop member 74, representing the locked state of the system. The movable contact 42 of the key interruptor 14 is in contact with the fixed contact 44, and the movable control contact 56 is in its stop position 0.

The first power supply interruptor 80, 84 is open, while the second power supply interruptor 80, 86 is closed. In consequence, the second terminal B2 of the power supply unit 68 for the electric motor 34 is not connected with the negative terminal −BAT of the battery of the vehicle.

Figure 2:
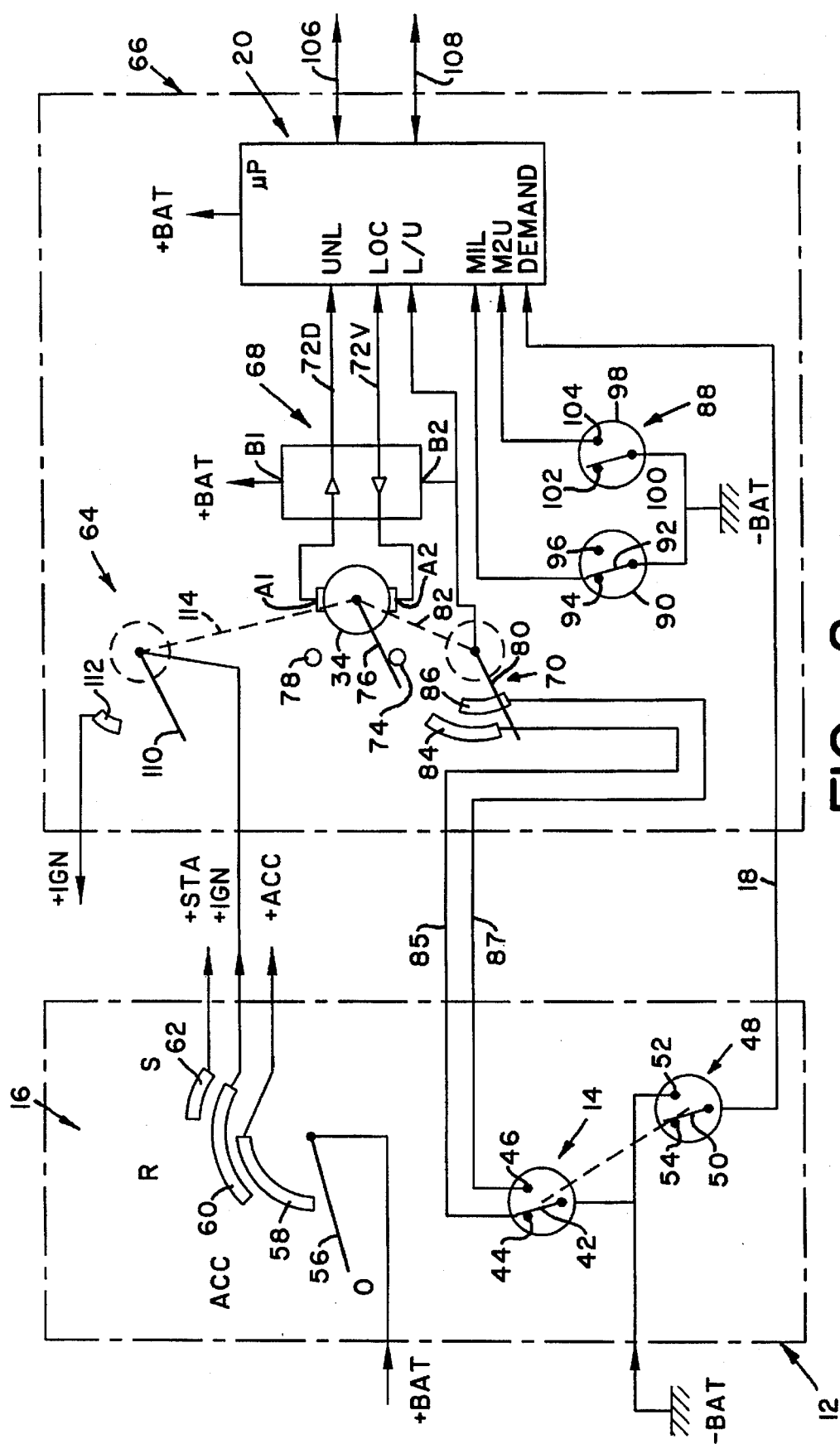
FIG. 2 is a diagram which illustrates the first embodiment of an electrical anti-theft system in accordance with the invention and including a central anti-theft unit, on which the electrical anti-theft system is shown in the locked state in the absence of a key.

When the driver introduces the key 10 into the switch 12, or when he simulates such an introduction, he causes an initial change of state to occur in the key interruptor 14, which passes from the position shown in FIG. 2 to the position shown in FIG. 3. In this new position, the movable contact 42 is in contact with the contact 46, thus making an electrical connection between the second terminal B2 of the power supply unit 68 and the negative terminal −BAT of the battery of the vehicle, via the line 87 and through the second power supply interruptor 80, 86, which is closed.

Simultaneously with the change of position of the key interruptor 14, the complementary interruptor 48 has also changed its position, and its movable contact 50 has established the electrical connection between the DEMAND input port of the central anti-theft unit 20 and the negative terminal −BAT of the battery. In consequence, the DEMAND input port has received a command which is analysed by the central anti-theft unit 20, which treats it as an order to unlock the system.

After having analysed the command, the central anti-theft unit 20 transmits, via the line 72D, an order to the power supply unit 68 which is a command to unlock. This results in rotation of the motor 34 in the clockwise direction (with reference to FIG. 3).

Any action by the driver on the multiple position control interruptor 16, whatever position he chooses for this interruptor, is unable to cause the motor to be started before the system is in its unlocked state, because the ignition circuit of the engine of the vehicle is receiving no power supply, due to the immobilising interruptor 64 being open.

Figure 4:
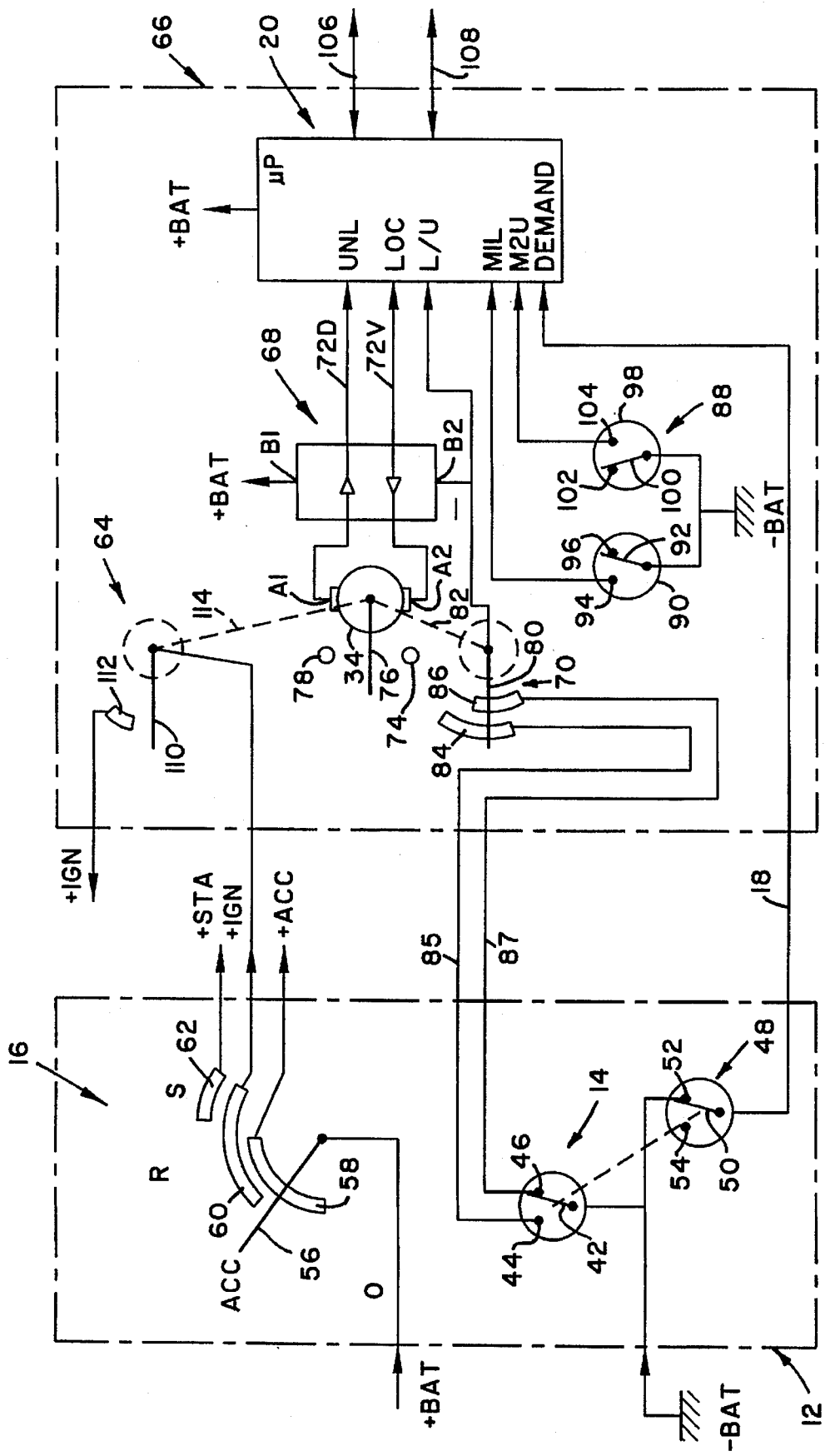
FIG. 4 is a diagram similar to that in FIG. 3, in which the electrical anti-theft system is shown in a phase of transition in which it is passing from the locked state to the unlocked state.

In the transition position shown in FIG. 4, between the locked state and the unlocked state of the system, it will be seen that the two power supply interruptors 80, 84 and 80, 86 are closed, and that the interruptor 90 for detection of the fact that the system is in its locked state has changed position, so sending a corresponding signal to the input port M1L of the central anti-theft unit 20.

The immobilising interruptor 64 is still open, and it is not possible to start the engine.

Figure 5:
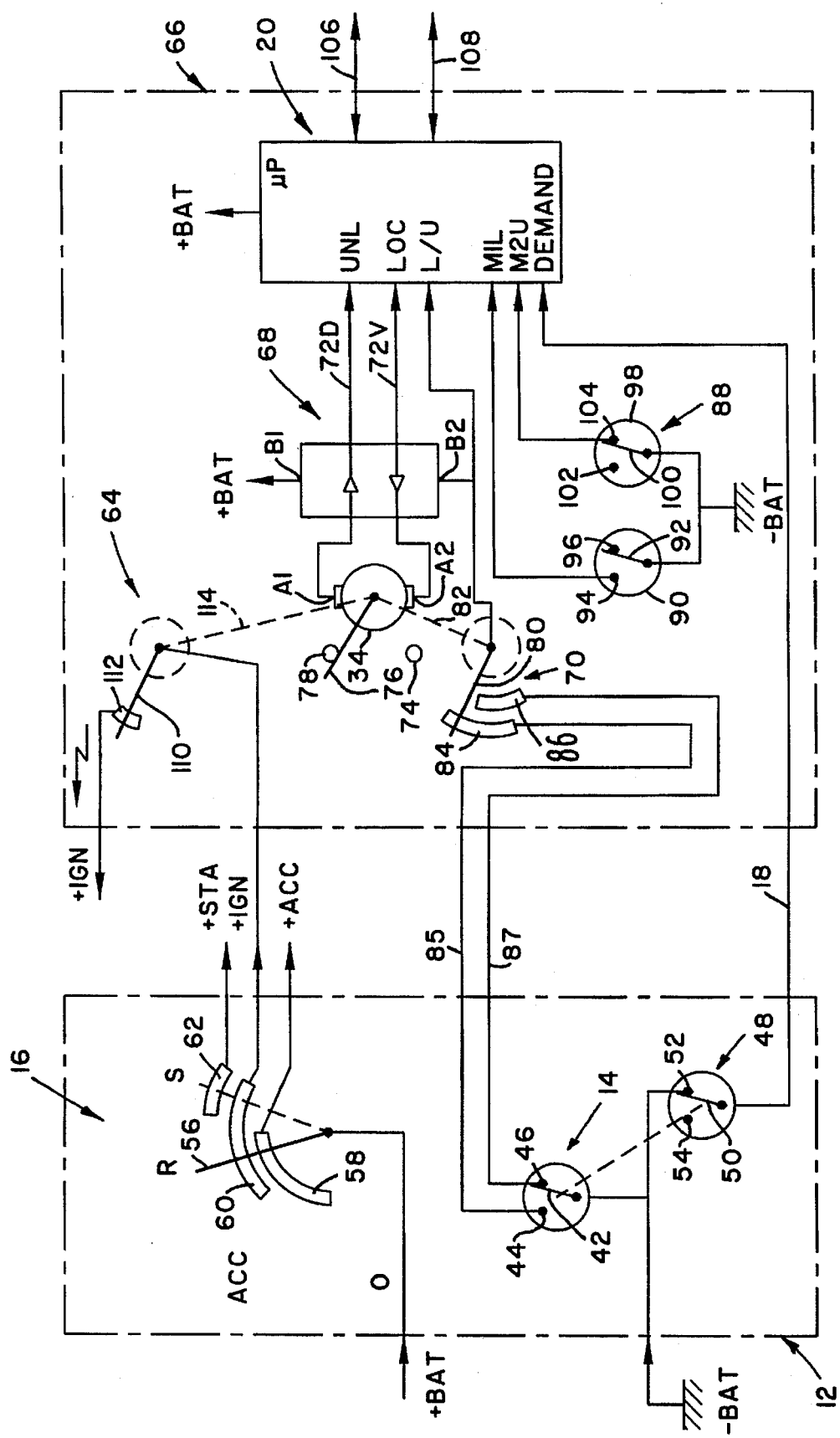
FIG. 5 is a diagram similar to that in FIG. 4, in which the electrical anti-theft system is shown in the unlocked state, in the presence of the key.

However, rotation of the motor 34 continues until the system is in the unlocked state illustrated in FIG. 5. When this condition is reached, the second power supply interruptor 80, 86 opens, and accordingly the second terminal B2 of the power supply unit 68 is no longer connected to the negative terminal −BAT of the battery of the vehicle: the motor 34 is therefore stopped, the anti-theft system being now in its unlocked condition.

When the unlocked condition of FIG. 5 is reached, the interruptor 98 for detection that the system is in its unlocked condition changes its position and sends a corresponding signal to the input port M2U of the central anti-theft unit 20, which is connected to the negative terminal −BAT of the battery of the vehicle. In the position shown in FIG. 5 the immobilising interruptor 64 is closed, and the ignition circuit of the engine is supplied with power because it is now connected to the positive terminal +BAT of the battery through the movable control contact 56, since the latter is now aligned with the conductive strip 60. The driver can now start the engine and use the vehicle.

Figure 6:
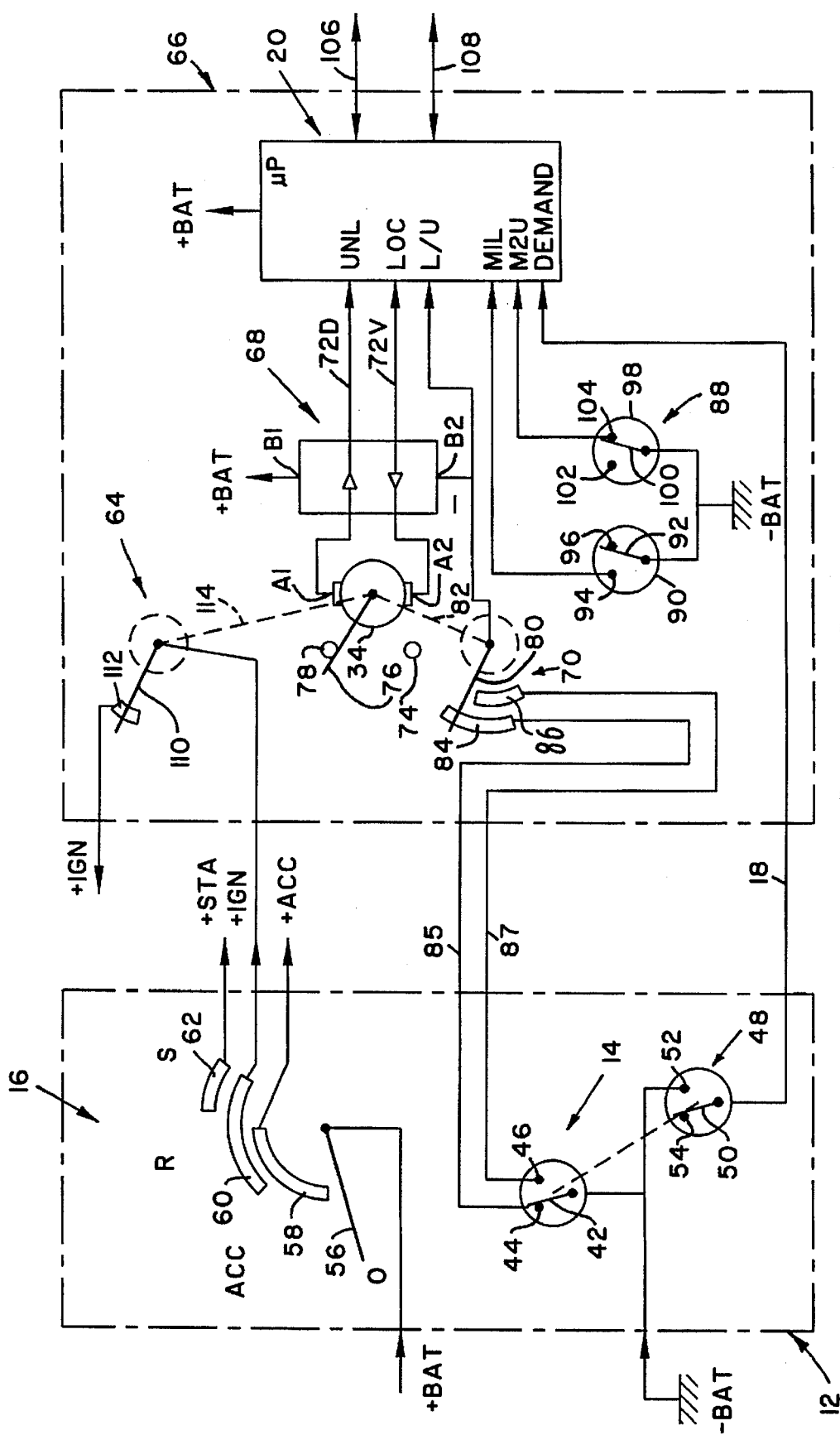
FIG. 6 is a diagram similar to that in FIG. 5, in which the electrical anti-theft system is shown in the unlocked state after the key has been withdrawn.

When the driver stops the vehicle, and switches off the engine, removal of the key causes the anti-theft security system to be locked. In this connection, when the key is withdrawn, and as is shown in FIG. 6, this causes the key interruptor 14 and the complementary interruptor 48 to change state simultaneously.

The change of position of the movable contact 50 of the complementary interruptor 48 causes a fresh change of state to occur at the DEMAND input of the central anti-theft unit 20, which analyses this change of state and interprets it as a command for locking of the system. The anti-theft unit 20 therefore sends a corresponding command, for locking the system, to the power supply unit 68 via the line 72V.

The second terminal B2 of the power supply unit 68 is connected to the negative terminal −BAT of the battery of the vehicle through the first power supply interruptor 80, 84 which is closed at this time, and through the line 85 and the moving contact 42 of the key interruptor 14. Accordingly, the command for locking the system which is sent to the power supply unit 68 on the line 72V is able to be carried out, and the motor 34 begins to rotate in the anticlockwise direction (with reference to FIG. 6).

Figure 7:
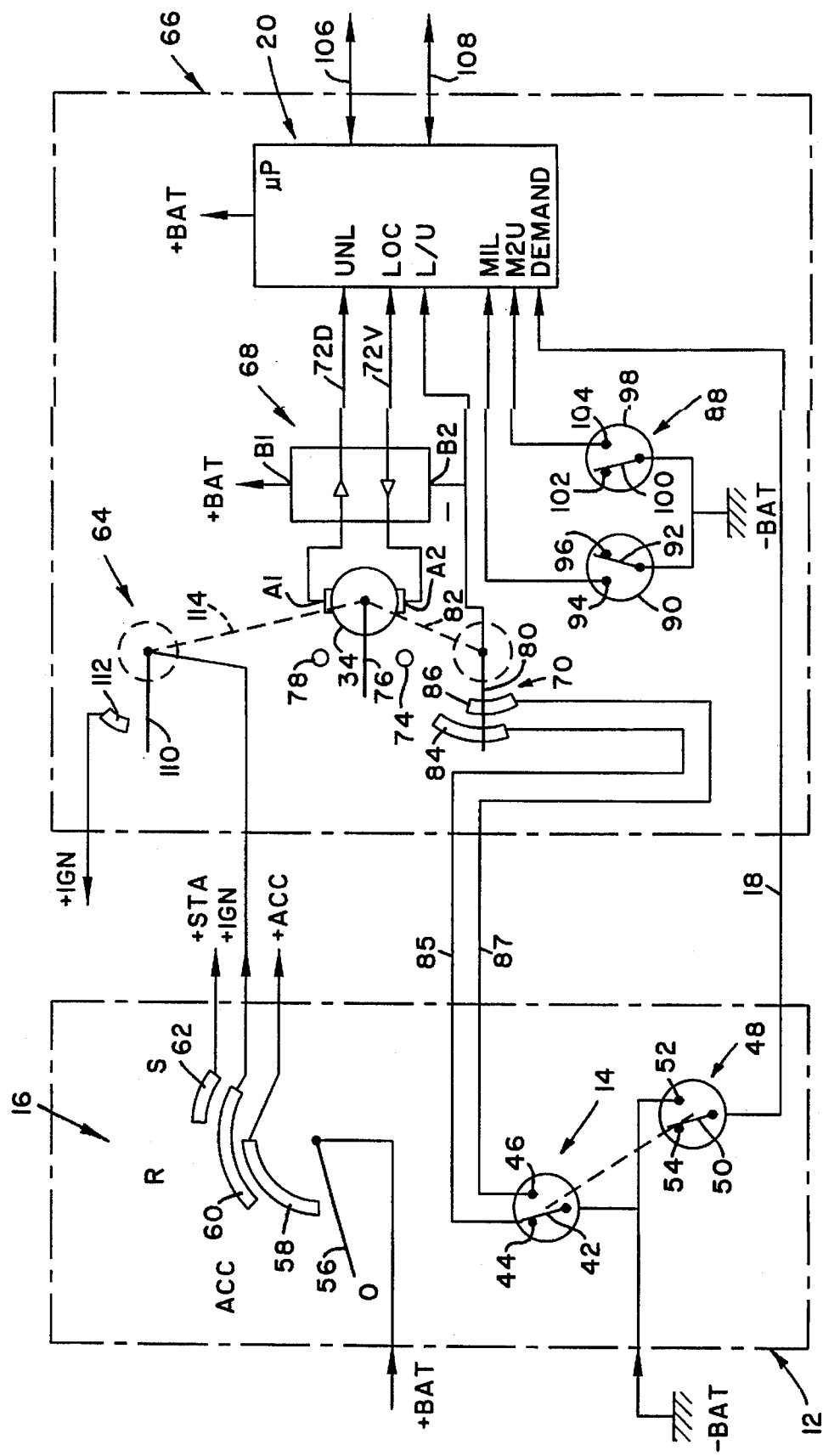
FIG. 7 is a diagram similar to that in FIG. 6, in which the electrical anti-theft system is shown in a transition phase in which it is passing from the unlocked state to the locked state.

When this rotation, to lock the system, has begun, and as is shown in FIG. 7, the immobilising interruptor 64 is immediately in the open condition. It is now impossible for the driver to start the engine of the vehicle again, because the system is now no longer fully unlocked.

In the transition state shown in FIG. 7, the two power supply interruptors 80, 84 and 80, 86 are closed, and the interruptor 98 for detecting that the system is in its unlocked condition has changed position, so sending a corresponding signal to the input M2U of the central anti-theft unit 20.

The anticlockwise rotation of the motor 34 does however continue, until it once again occupies its rotational position corresponding to the locked condition, as shown in FIG. 2. When it has returned to this locked position, the interruptor 90 has again changed position, so sending a corresponding signal to the input M1L of the central anti-theft unit 20. Any new demand now addressed to the anti-theft unit 20 on its DEMAND input port will therefore be treated by the latter as a request for unlocking of the anti-theft system.

Figure 8:
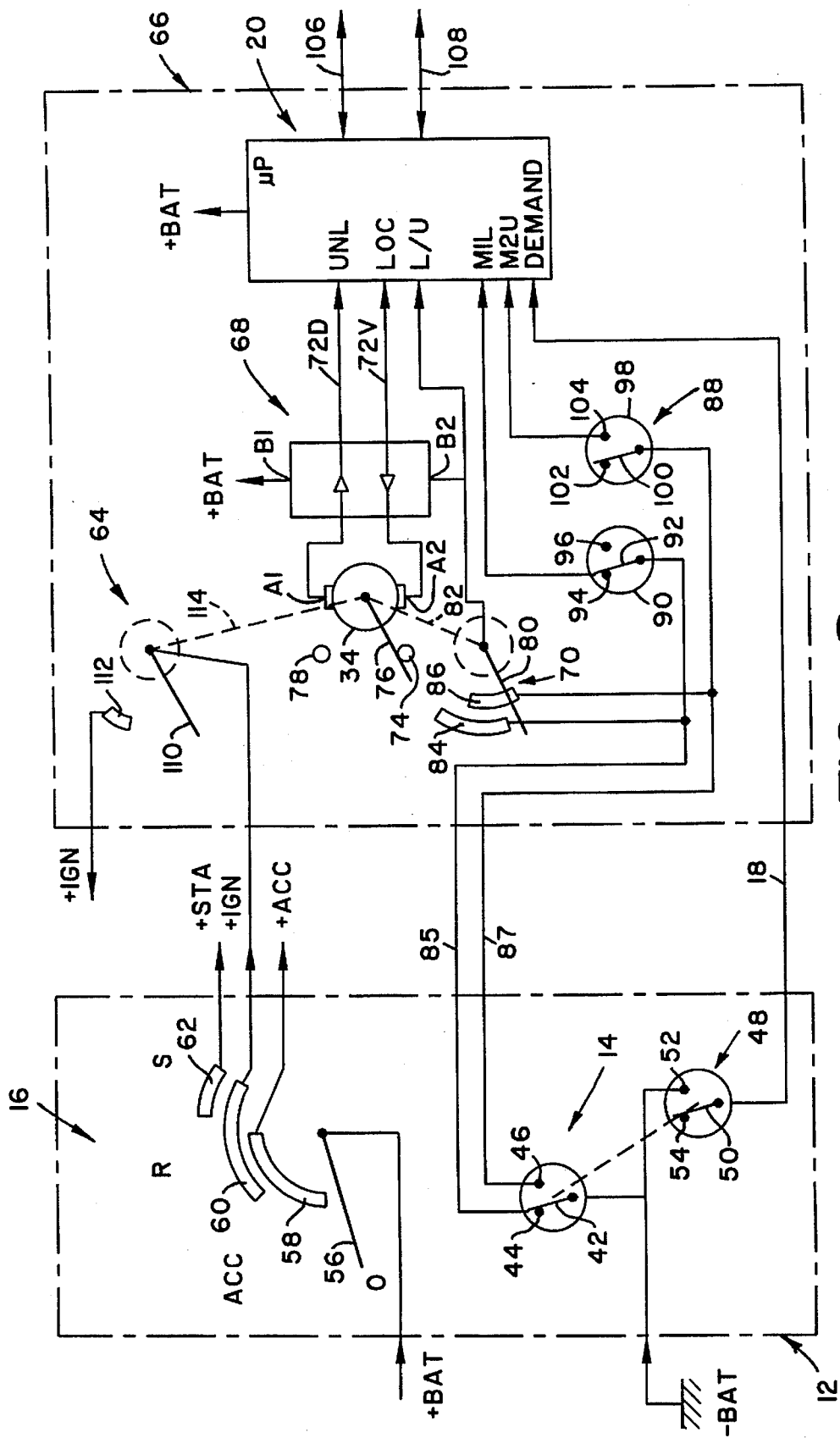
FIG. 8 is a diagram similar to that in FIG. 2, which shows a modified embodiment of the means for detecting the state of the anti-theft system.
Figure 9:
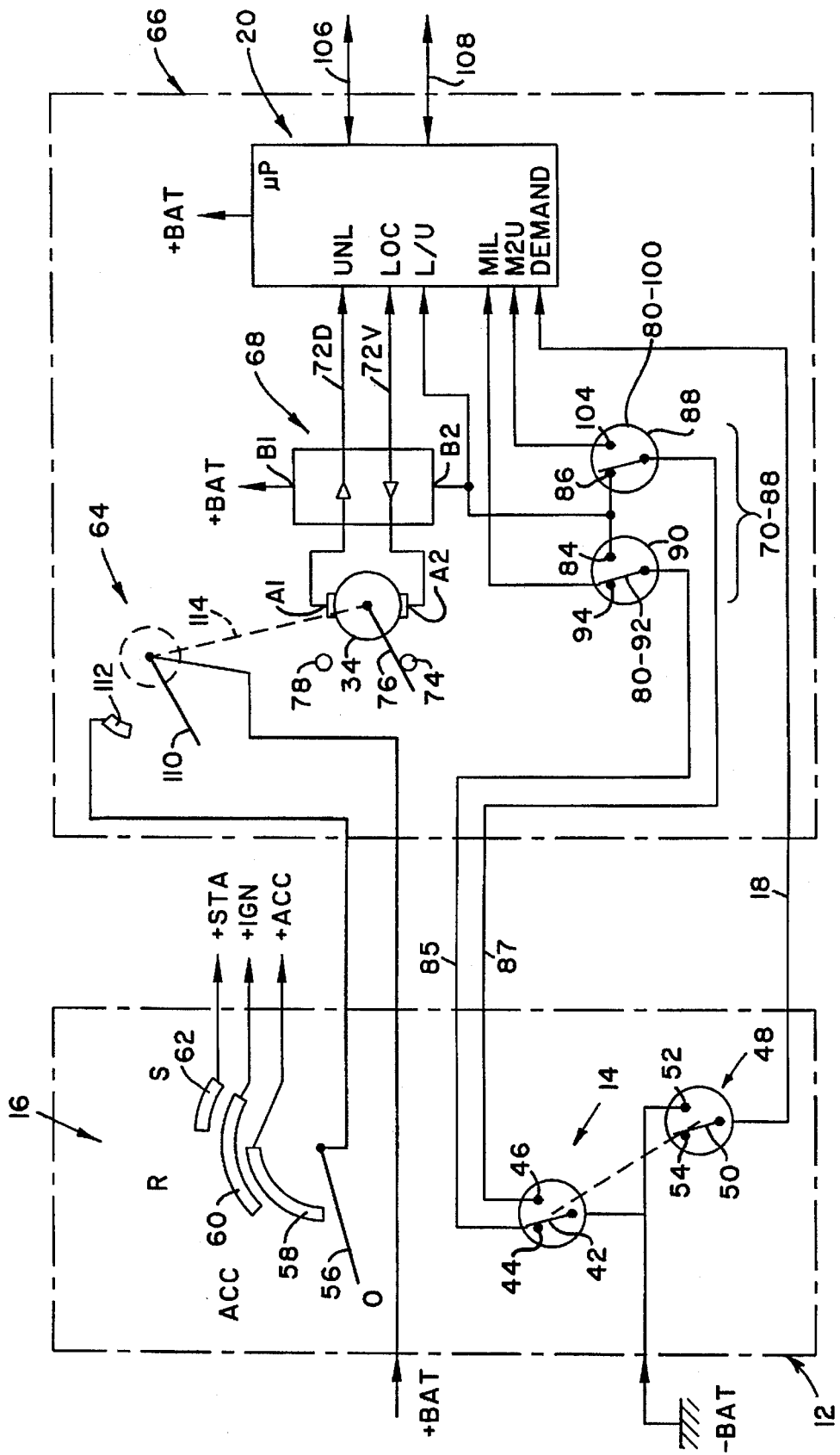
FIGS. 9 to 14 are diagrams similar to those in FIGS. 2 to 7 respectively, but showing a second embodiment of an electrical anti-theft system in accordance with the invention.
Figure 10:
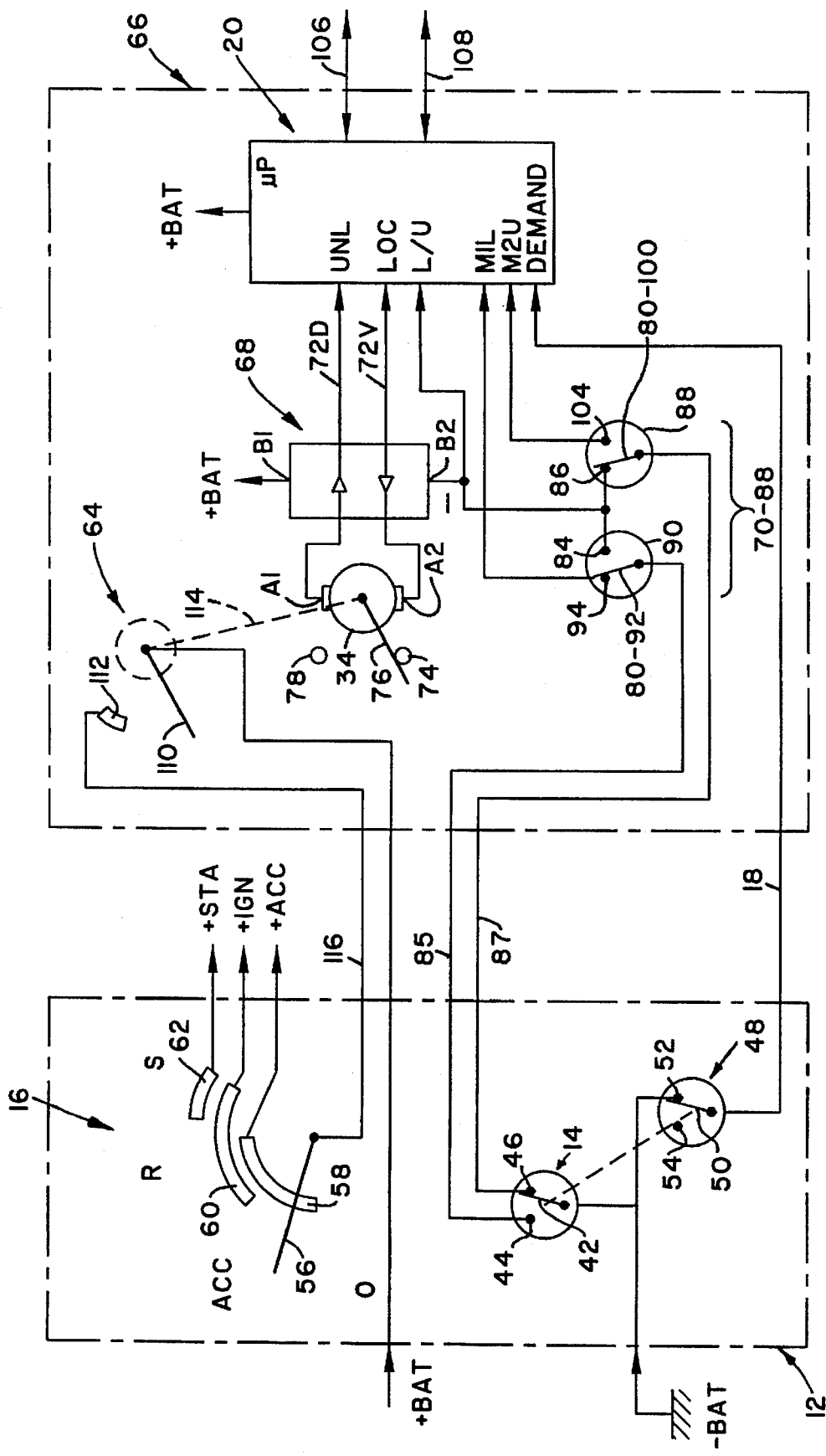
Figure 11:
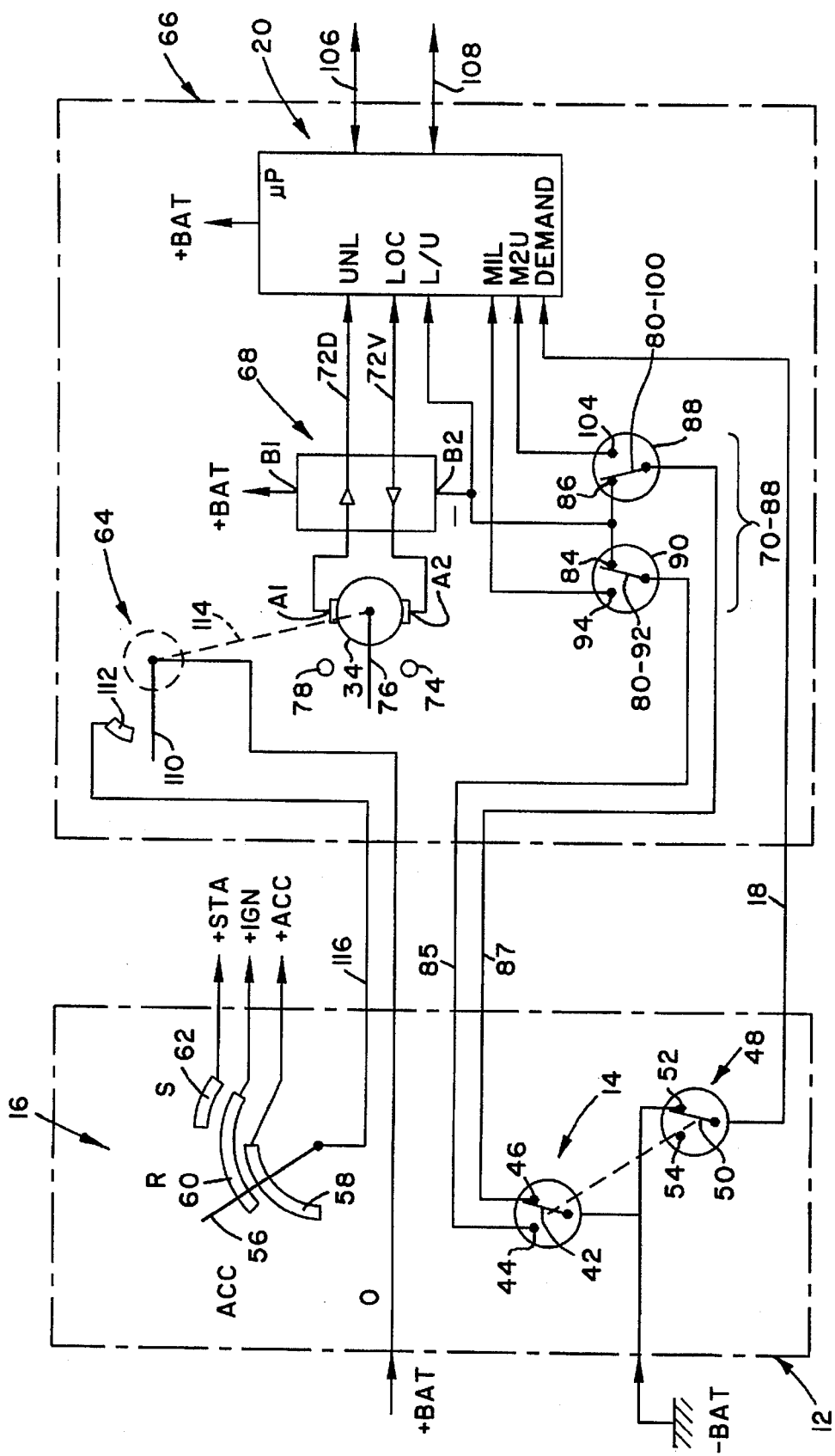
Figure 12:
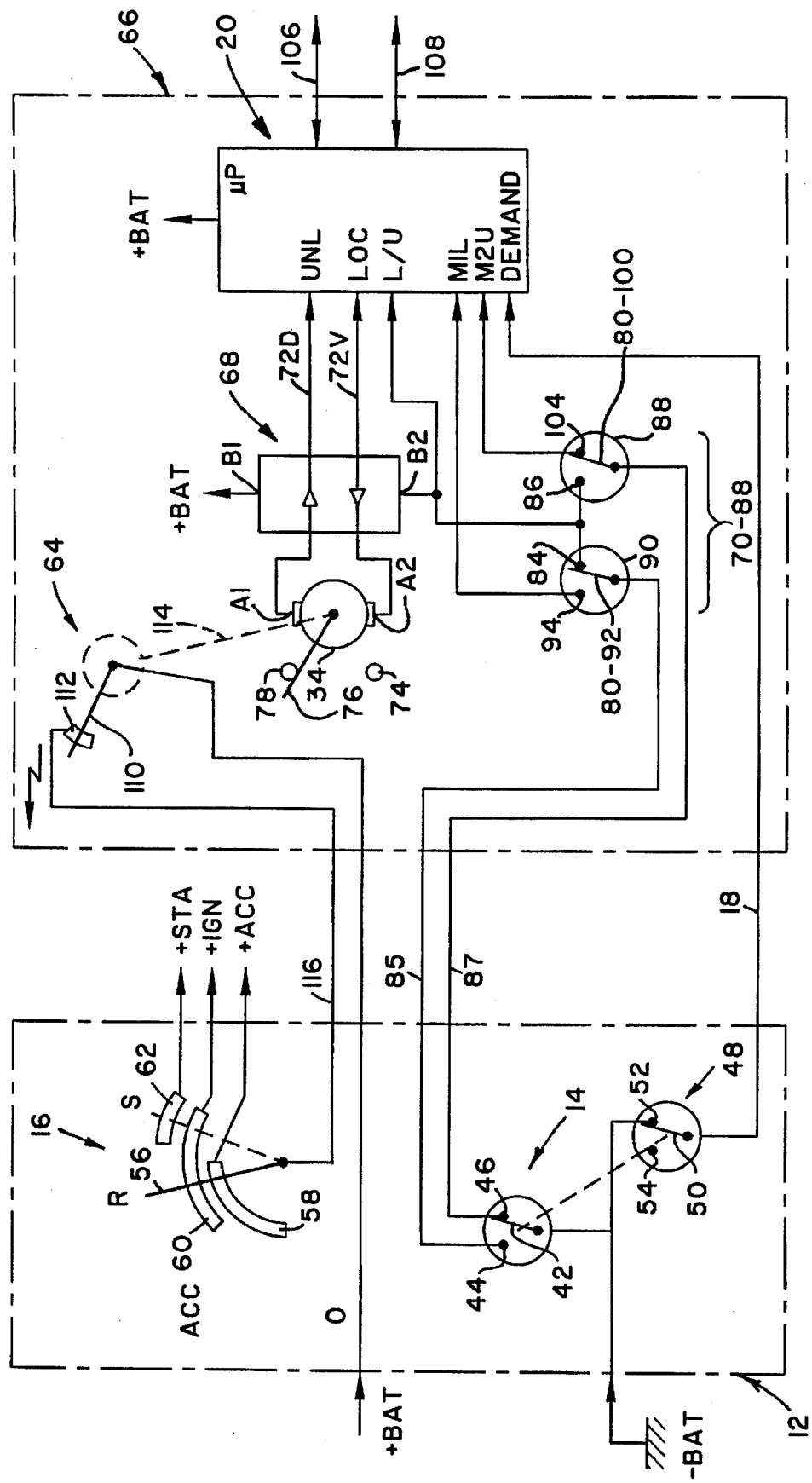
Figure 13:
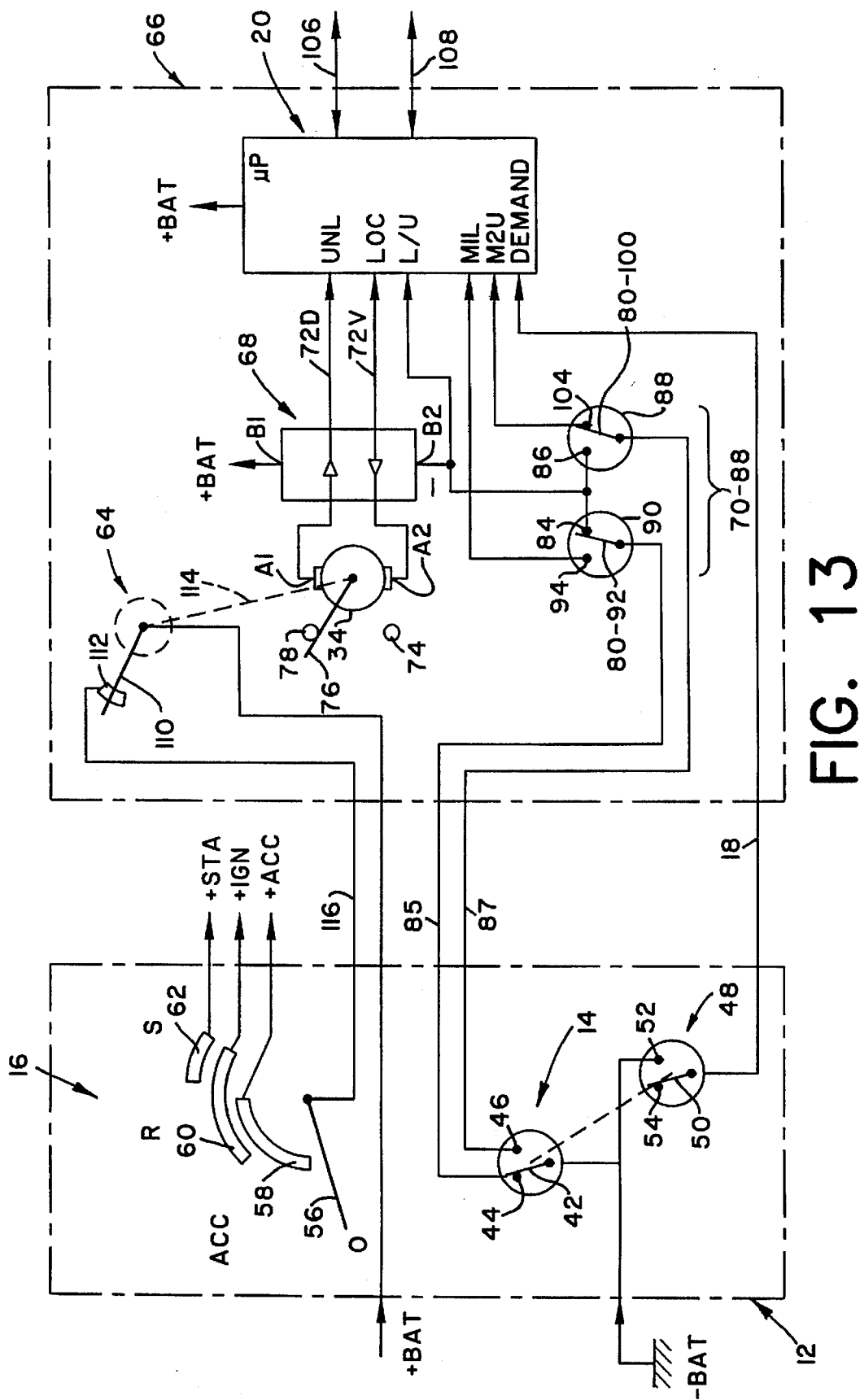
Figure 14:
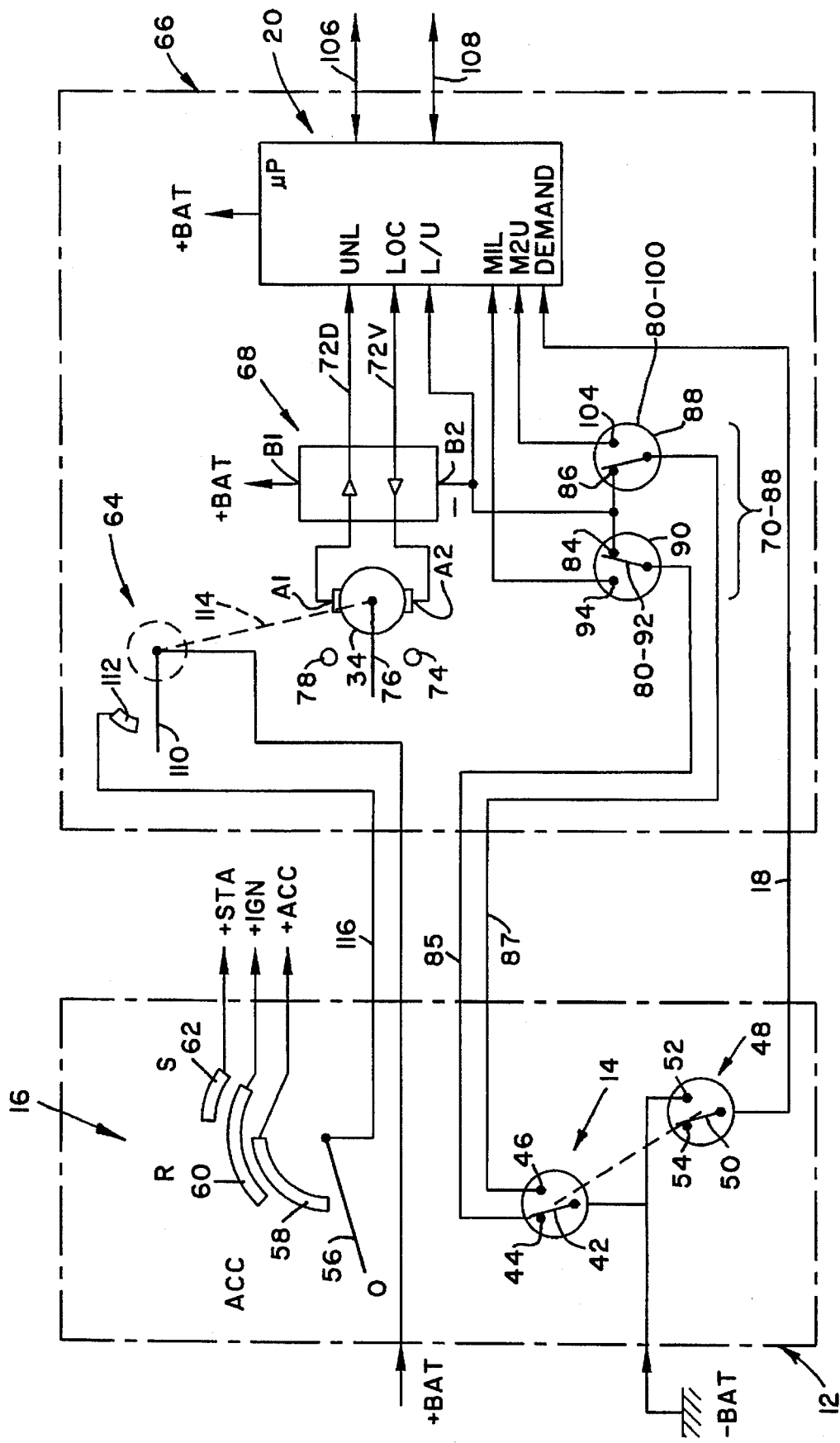

Reference is now made to FIG. 8, showing a modified version of the system. This version differs from the first embodiment described above with reference to FIGS. 2 to 7 only in so far as the movable contact 92 of the interruptor 90 for detection of the locked state of the system is not connected directly to the negative terminal −BAT of the battery. Instead, it is connected directly to the first fixed contact 44 of the key interruptor 14. Similarly, the movable contact 100 of the interruptor 98 that detects the unlocked state of the system is connected directly to the second fixed contact 46 of the key interruptor 14. The anti-theft security system in the embodiment of FIG. 8 operates in an identical manner, in all respects, to that described with reference to FIGS. 2 to 7.

With reference now to FIGS. 9 to 14, the further embodiment shown in those Figures will now be described. This embodiment differs from the first version shown in FIGS. 2 to 7 firstly in respect of the structure of the means for inhibiting the system.

In this connection, in this embodiment the rotating control contact 56 is connected through a line 116 to the fixed contact pad 112 of the immobilising interruptor 64. The rotating contact 110 of the interruptor 64 is permanently connected to the positive pole BAT of the battery. In consequence, the starting circuit +STA, the ignition circuit +IGN and the accessory circuit +ACC of the vehicle are unable to be supplied with electrical power by cooperation of the movable control contact 56 with the corresponding fixed contact strip 62, 60 or 58, except when the immobilising interruptor 64 is closed, that is to say when the system as a whole is in its unlocked condition.

Another difference between this second embodiment of FIGS. 9 to 14 and that described above lies in the structure of the power supply interruptors and the interruptors which detect that the system is in its locked or its unlocked state. In the present version, these are combined. In this connection, as can be seen in particular in FIG. 9, the first power supply interruptor is constituted by a movable contact 80–92, which is arranged to cooperate with a fixed contact 84 connected to the terminal B2 of the power supply unit 68, or with a fixed contact 94 which is connected to the input M1L of the central anti-theft unit 20, thus constituting an interruptor 90 for detecting that the system is in its locked condition.

In the same way, the second power supply interruptor is constituted by a movable contact 80–100 which is arranged to cooperate with a contact 86 connected to the terminal B2 of the power supply unit 68 or with a fixed contact 104 connected to the input M2U of the central anti-theft unit 20.

However, like the embodiment described above with reference to FIG. 8, the embodiment shown in FIGS. 9 to 14 again operates in all respects in a manner identical with the first embodiment shown in FIGS. 2 to 7.

What is claimed is:

1. An anti-theft system for a vehicle having a power supply source, comprising: an anti-theft security switch for controlling the power supply to various electrical circuits of the vehicle; a motorised security device comprising a blocking member and an electric drive motor coupled to the blocking member for displacing the latter between a locked position and an unlocked position; and an electronic central anti-theft unit connected electrically to the said anti-theft security switch and to the said motor, the central anti-theft unit being adapted to control operation of the anti-theft system, wherein the said anti-theft security switch comprises a key interruptor for detecting simulated introduction of a key into the anti-theft switch, and a multiple position control interruptor for connection to said electrical circuits of the vehicle and for controlling the supply of power to said circuits in sequence, the said multiple control interruptor comprising a movable control contact connected to one polarity of the power supply source, and a set of fixed contacts for connection to respective said circuits of the vehicle, the said set of fixed contacts being so disposed as to be contacted successively by the movable control contact of the multiple position control interruptor as the said movable contact is operated with a view to starting the vehicle, the system further including an immobilising device connected between the multiple position control interruptor and one polarity of the said power source; a first power supply interruptor and a second power supply interruptor, each coupled to the motor for operation between an open position and a closed position, and arranged to be open when the system is in its locked and unlocked conditions respectively;

and wherein at least one said vehicle circuit is connected to one polarity of the said supply source through the multiple control interruptor and the immobilising device, whereby the supply of power to the said at least one circuit is inhibited except when the system is in its unlocked condition, the key interruptor having a movable contact connected to the said supply source, a first fixed contact connected electrically to the motor through the said first power supply interruptor, for cooperation of the said first fixed contact with the movable contact of the key interruptor in the absence of a key for actuating the key interruptor, and a second fixed contact connected electrically to the motor through the said second power supply interruptor, for cooperation with the said movable contact of the key interruptor in the presence of a said key, and wherein the said central anti-theft unit has a first input for detection of a change of position of the movable contact of the key interruptor, a second input for detection of the locked condition of the system, and a third input for detection of the unlocked condition of the system, the system further including condition detecting means for detecting the locked or unlocked condition of the system and means connecting the said second and third inputs of the central anti-theft unit to the condition detecting means.

2. A system according to claim 1, wherein the immobilising device is an immobilising interruptor having a movable contact connected to the said fixed contact of the said multiple position interruptor, and a fixed contact for cooperation with the said movable contact so as to connect the latter to the said vehicle circuit when the system is in its unlocked condition.

3. A system according to claim 1, wherein the said movable control contact of the multiple position interruptor is connected to the said polarity of the supply source through the said immobilising device.

4. A system according to claim 3, wherein the immobilising device is an immobilising interruptor having a movable contact connected to one polarity of the said supply source, and a fixed contact connected to the said movable control contact of the multiple position interruptor, the immobilising interruptor being arranged so that its movable contact cooperates with its said fixed contact when the system is in its unlocked condition.

5. A system according to claim 2, further including coupling means coupling the movable contact of the immobilising interruptor with the motor for rotation of the said movable contact by the motor.

6. A system according to claim 1, wherein the first power supply interruptor comprises a movable contact, means coupling the movable contact permanently to the motor for rotation of the movable contact by the motor, and a first fixed contact connected electrically to the first fixed contact of the key interruptor, for cooperation between the said movable contact and first fixed contact of the first power supply interruptor when the said first power supply interruptor is closed, and wherein the second power supply interruptor comprises a movable contact, means coupling the movable contact permanently to the motor for rotation of the movable contact by the motor, and a second fixed contact connected electrically to the second fixed contact of the key interruptor, for cooperation between the said movable contact and second fixed contact of the second power supply interruptor when the second said power supply interruptor is closed.

7. A system according to claim 6, wherein the said first and second fixed contacts are conductive strips offset from each other, the said movable contacts of the first and second power supply interruptors being defined by a single common contact member, the system said coupling means being a single coupling means coupling the said common contact member with the motor for rotation of the said common member by the motor.

8. A system according to claim 1, further including a complementary interruptor having a movable contact and means coupling the movable contacts of the said key interruptor and complementary interruptor together for simultaneous movement, the said first input of the central anti-theft unit being connected to one polarity of the said power supply source through the said complementary interruptor, the latter being such that it is closed in the absence of a key.

9. A system according to claim 1, wherein the said means for detecting the condition of the system comprise: a first detection interruptor and a second detection interruptor, for detecting that the system is locked and unlocked respectively, each said detection interruptor having a respective movable contact connected to one polarity of the said power supply source, each of the first and second detection interruptors further having a fixed contact, the said fixed contacts of the first and second detection interruptors being connected to the said second and third inputs, respectively, of the central anti-theft unit, for cooperation with the corresponding said movable contact when the system is in its locked condition and its unlocked condition respectively.

10. A system according to claim 9, wherein the movable contact of the said first detection interruptor is connected to the said first fixed contact of the key interruptor, the movable contact of the said second detection interruptor being connected to the said second fixed contact of the key interruptor.

11. A system according to claim 9, wherein the movable contacts of the said first detection interruptor and first power supply interruptor are defined by a single common first movable contact element, the movable contacts of the second detection interruptor and second power supply interruptor being defined by a single common second movable contact element, each said detection interruptor having a fixed contact connected to the said first input of the central anti-theft unit, such that, when the first power supply interruptor and the second power supply interruptor, respectively, is open, its said movable contact element cooperates with the corresponding said fixed contact.

12. A system according to claim 1, further including a power supply unit for controlling the supply of power to the said motor, the said power supply unit having inputs connected to the central anti-theft unit for receiving from the latter command signals for locking and unlocking the system respectively, and further having a first terminal permanently connected to a first polarity of the said power supply source, and a second terminal, the system further including means connecting the said second terminal to a second polarity of the said power supply source through the key interruptor and through a further interruptor selected from the said first and second power supply interruptors.

13. A system according to claim 1, wherein the said anti-theft security switch is a rotary switch.

* * * * *